US008719499B2

(12) United States Patent
Auernhammer

(10) Patent No.: US 8,719,499 B2
(45) Date of Patent: May 6, 2014

(54) CACHE-LINE BASED NOTIFICATION

(75) Inventor: Florian Alexander Auernhammer, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 12/368,350

(22) Filed: Feb. 10, 2009

(65) Prior Publication Data

US 2010/0205379 A1 Aug. 12, 2010

(51) Int. Cl.
*G06F 12/00* (2006.01)
*G06F 12/08* (2006.01)
*G06F 9/54* (2006.01)

(52) U.S. Cl.
CPC ............ *G06F 12/0842* (2013.01); *G06F 9/542* (2013.01)
USPC ................... 711/118; 711/146; 711/E12.017; 711/E12.033

(58) Field of Classification Search
CPC .............................. G06F 12/0842; G06F 9/542
USPC .................................................. 711/118, 146
See application file for complete search history.

(56) References Cited

U.S. PATENT DOCUMENTS

| | | | |
|---|---|---|---|
| 5,983,329 A * | 11/1999 | Thaler et al. ................... | 711/163 |
| 6,370,622 B1 | 4/2002 | Chiou et al. | |
| 6,711,650 B1 | 3/2004 | Bohrer et al. | |
| 7,415,699 B2 * | 8/2008 | Gouriou et al. ................ | 717/127 |
| 2004/0148473 A1 * | 7/2004 | Hughes et al. ................. | 711/144 |
| 2006/0064518 A1 | 3/2006 | Bohrer et al. | |
| 2006/0085791 A1 * | 4/2006 | Day et al. ....................... | 718/100 |
| 2006/0221827 A1 | 10/2006 | Makhervaks et al. | |
| 2006/0235999 A1 | 10/2006 | Shah et al. | |
| 2009/0086746 A1 * | 4/2009 | Kroeger et al. ................ | 370/412 |
| 2009/0144505 A1 * | 6/2009 | Auernhammer et al. ..... | 711/128 |

OTHER PUBLICATIONS

Baker, et al., "VIA Communication Perfeormance on a Gigabit Ethernet Cluster"; Aug. 2001.

* cited by examiner

*Primary Examiner* — Reginald Bragdon
*Assistant Examiner* — Aracelis Ruiz
(74) *Attorney, Agent, or Firm* — Scully Scott Murphy & Presser PC; Daniel P. Morris, Esq.

(57) ABSTRACT

Embodiments of the invention provide a method, system, and computer program product for cache-line based notification. An embodiment of the method comprises injecting a cache-line including notification information into a cache of a processing unit, marking the cache-line as having the notification information, and using the notification information to notify a processing thread of the presence of the cache-line in the cache. In an embodiment, the cache-line identifies a thread affiliation. In an embodiment, a multitude of threads operate in the processing unit, and the using includes notifying a plurality of these threads of the presence of the cache-line in the cache, and analyzing the cache-line to identify this plurality of threads. The cache may include a plurality of cache-lines, each of which includes a notification, and the processing unit thread uses these notifications to form a linked list of at least some of the cache-lines.

20 Claims, 3 Drawing Sheets

CACHE-LINE BASED NOTIFICATION

BACKGROUND OF THE INVENTION

1. Field of the Invention

The present invention generally relates to a cache-injection enabled computer system, and more particularly, to a cache-line based notification in such computer systems.

2. Prior Art

Today's computer systems offer more and more processing cores in order to increase the performance of the system as a whole, while the single-core performance almost stays the same. However, it is not yet clear how to use the new resources efficiently. One approach is, for example, on-loading of tasks that were formerly off-loaded to dedicated devices, for example, the network packet processing. In order to cope with the increasing needs in packet processing, concepts have been developed that take advantage of the use of dedicated cores for network packet processing. Those concepts may use a doorbell mechanism, which is a mechanism used to notify a process or application that a new request is available. This mechanism can so far not be implemented efficiently in software.

Some processors today offer the possibility to wait on a cache-line (CL) modification of the local cache and use it as a wake-up instruction. This mechanism is especially efficient in multi-threaded processing units. On the other hand, this mechanism can only be used for one single cache-line, so either the serving process only gets a single doorbell cache-line, which is not practical for multi-user serving, or the serving process has to know exactly where the next request will arrive, which is again not possible in many-to-one communication situations.

SUMMARY OF THE INVENTION

Embodiments of the invention provide a method, system, and computer program product for cache-line based notification. An embodiment of the method comprises injecting a cache-line including notification information into a cache of a processing unit, marking the cache-line as having the notification information, and notifying a processing thread operating on the processing unit of the presence of the marked cache-line in the cache.

In an embodiment, the cache-line identifies a thread affiliation. In an embodiment, a multitude of threads operate in the processing unit, and the notifying includes notifying a plurality of said multitude of threads of the presence of the cache-line in the cache, and analyzing the cache-line to identify said plurality of threads. In an embodiment, the marking is done while injecting the cache-line into the cache. In an embodiment, the cache includes a plurality of cache-lines, each of said cache-lines includes a notification, and said processing unit thread uses the notifications to form a linked list of at least some of the cache-lines in the cache.

An embodiment of the invention includes the injection of a notification or work request into the cache of a server processing unit. A mechanism that enables directed injection of cache lines is, for example, described in European Patent Application No. 08105023.9, for "Method And Arrangement For Directing Cache Injection," the disclosure of which is herein incorporated by reference in its entirety. This method for directing cache injection comprises using a snooping based fabric with at least two bus-coupled processing units, at least one of those processing units adapted to work as an injection unit for directing cache injection. The at least one processing unit transmits a snoop request to at least one destination processing unit of the other bus-coupled processing units, said snoop request having at least an identification value with at least a function identifier identifying a destination function for the cache injection adapted to run on at least one of said destination processing units. The latter responds to said snoop request with a snoop response to the injection processing unit, said snoop response having at least a function response value indicating if said function identifier matches a function indication of a snoop register for said destination processing unit. Analyzing the response(s), the requesting processing unit determines where to inject the data into.

In an embodiment of the present invention, while injecting the cache-line, the line is marked as having notification data using a mechanism as, or similar to, described in European Patent Application No. 07122112.1 for "Memory Device," the disclosure of which is herein incorporated by reference in its entirety. In the mechanism disclosed in said European Patent Application No. 07122112.1, a cache comprising a predetermined amount of cache sets is disclosed, each cache set comprising a predetermined amount of cache-lines. In shared memory processor systems, a set of control bits is available for every cache-line indicating the current state of the data stored in the particular cache-line. The control bits are often referenced as coherence bits indicating, for instance, the owner and/or the modified state of the cache-line data. Cache injection data is typically exclusively owned by the particular cache memory after it is brought into the cache. With control bits, different states of cache line data can be indicated by using different combinations of control bits. Typically different combinations are used for shared, modified and exclusively owned data. In one embodiment, the coherence bits are extended by an additional bit indicating that the cache-line was injected into the cache. As the cache-line state of an injected cache-line is predetermined as described above, the other coherence bits can be reused for injected data. A state may be defined in the system indicating that the injected data contains a notification, and is such marked as containing notification data. A cache-line that is marked accordingly is presented to the processing unit. The cache is also operable to unset the injection-bit if the particular cache injection data entry is accessed by a processing unit when it processes the cache injection data. The injection bit is then cleared and the coherence bits are set according to the coherence state of the cache-line in the system.

In an embodiment of the present invention, having the above-discussed notification indication, the first part of the cache line or its address can be presented to the processing unit which can also be woken up if it is configured to do so as done in today's systems for a single cache line. After processing of the notification the cache-line is unmarked. Afterwards, if present in the cache, further notifications can be presented.

DETAILED DESCRIPTION OF THE PREFERRED EMBODIMENT

Figure 1:
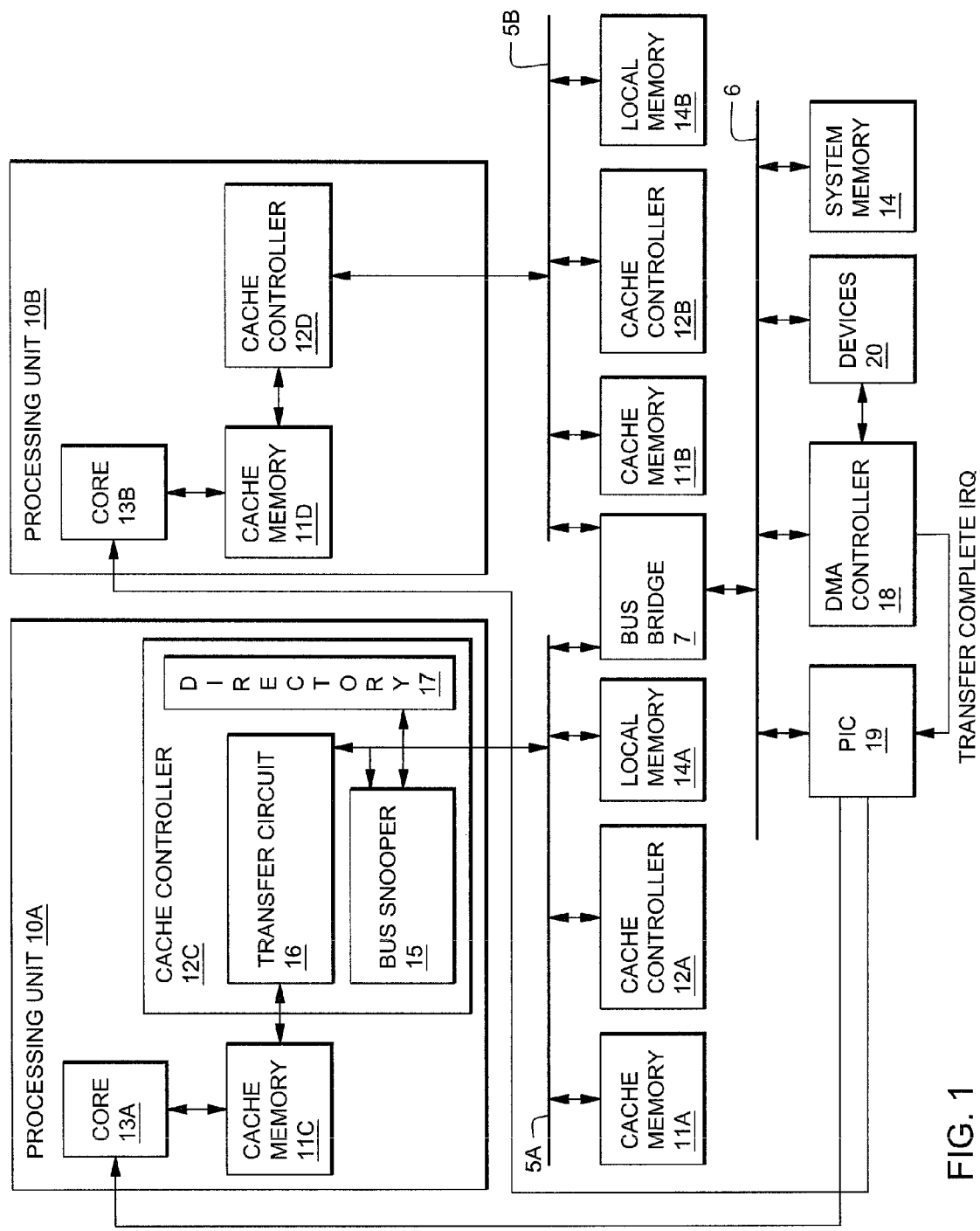
FIG. 1 is a block diagram of a processing system in which the present invention may be practiced.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, there is depicted a block diagram of a system in accordance with an embodiment of the present invention. In the depicted system, access to a system memory 14 is symmetrical and the depicted system will be used to describe operation of an SMP multiprocessor system in accordance with an embodiment of the present invention, even though it should be noted that access to optional local memories 14A and 14B are non-uniform. It should be understood that the depicted embodiment is only one simplified example of a multiprocessor system in which the present invention may be embodied.

Processing units 10A and 10B are identical processing units each coupled to a unique local bus 5A, 5B that provides interconnection of each processing unit with an associated lower-level cache memory 11A, 11B, lower-level cache controller 12A, 12B, and local memory 14A, 14B (if present). A bus bridge 7 connects local buses 5A and 5B to a system bus 6 to which a programmable interrupt controller (PIC) 19, a DMA controller 18 (which could be included in bus bridge 7), various I/O devices 20 and a system memory 14 are attached. Each processing unit 10A, 10B includes a core 13A, 13B coupled to a cache memory 11C, 11D that is managed by a cache controller 12C, 12D. Cache controller 12C is depicted in detail as including a cache directory 17 that tracks the status of each cache line via flags that indicate whether the line is valid, and other status bits, along with tags that indicate the corresponding addresses in memory with which each valid tag line is associated.

Cache controller 12C also contains a bus snooper 15 that observes transactions on bus 5A (5B for cache controller 12D) so that accesses to memory that affect memory locations associated with a valid cache line can be noticed and cache directory 17 will be updated as necessary. Note that the memory locations mapped in cache memory 11C may include locations in local memories 14A, 14B as well as locations in system memory 14.

In the system of FIG. 1, bus snooper 15 may also be used to observe DMA transactions to any memory location, so that DMA transfer data can be injected into cache memory 11C lines to accelerate DMA transfer processing, if processing unit 10A is either selected or identified as the target processing unit, i.e., the processing unit that will process the DMA-transferred data. Transfer circuit 16 provides the mechanism for transferring data from memory 14, 14A, 14B to cache memory 11C and is directed by cache controller 12C to transfer values forming part of a DMA transfer into cache memory 11C during the DMA transfer. Thus, directory 17 can maintain the valid status of a cache line affected by the DMA transfer, as the cache line will be updated during the DMA transfer. The cache data reflecting the transferred data will be valid before execution of DMA completion routines and subsequent processes that "touch" the resulting transferred values.

Similar to the above description, cache controllers 12A and 12B incorporate similar cache injection mechanisms for populating lower-level cache memories 11A and 11B with DMA-transferred data. In general, if the memory addresses of data transferred via DMA to one of memories 14, 14A or 14B are mapped in any of cache memories 11A-11D, the affected cache lines will be injected as the transfer commences. If a cache line does not exist for the target cache, then lines will be allocated if determined to be available according to the cache allocation algorithm. If no line is allocated, no action needs to be taken with respect to the data, as the next access to a memory location that is not loaded into a cache line will result in a cache miss and a cache line will be loaded with the values from memory.

DMA transfers may include transfers from devices 20 to system memory 14 (or one of local memories 14A or 14B) via DMA controller 18, transfers to system memory 14 from other memories (not shown) on bus 6, transfers from one location in system memory 14 from other locations in system memory 14 directed by DMA controller 18 or DMA transfers between system memory and one of local memories 14A and 14B). The DMA transfer may be detected at bus snooper 15 by a bus command decode or a special address bit that indicates that a DMA transfer is being performed, or a range of memory addresses may be uniquely allocated for DMA transfers and bus snooper 15 then detects writes to that memory range. However, in order for transfers occurring solely between devices 20 and memory 14 on bus 6 to be seen by the higher-level cache controllers 12C, 12D, bus bridge 7 must snoop transactions on bus 6 and reflect those transactions on bus 5A or bus 5B so that a bus snooper in cache controller 12C or 12D will "see" the transaction in order to perform the associated cache injection. A per-processing unit range may also be used to target a particular bus snooper to load its associated cache. Further, a processing unit/cache ID may be made part of the bus protocol, specifically targeting a particular processing unit/cache for cache injection.

In response to the detection of a DMA transfer, transfer circuit 16 commences transfer of the DMA transfer values to cache memory 11C lines that are affected by the transfer and may also optionally transfer values into new lines allocated for the DMA transfer by cache controller 12A if space for the new lines is available (either by unused/invalid/empty line detection or by a cast-out algorithm that recognizes a certain priority for DMA transfer data). At the end of the DMA transfer, DMA controller 18 generates an interrupt request to PIC 19, which interrupts one of processing units 10A or 10B. PIC 19 includes an interrupt mask register that permits selection of which processing unit 10A, 10B to interrupt for a given interrupt request (IRQ) and therefore the interrupt generated upon DMA transfer completion may be assigned to either of processing units 10A, 10B.

As mentioned above, some processors today offer the possibility to wait on a cache-line (CL) modification of the local cache and use it as a wake-up instruction. This mechanism is especially efficient in multi-threaded processing units. On the other hand, this mechanism can only be used for one single cache-line, so either the serving process has only a single doorbell cache-line, which is not practical for multi-user serving, or the serving process has to know exactly where the next request will arrive which is again not possible in many-to-one communication situations. Further, in most cases, either a very expensive mechanism using system-calls or constant polling on notification cache-lines, which is inefficient in terms of processing unit usage and power-consumption and at the same time inefficient if the number of consumers is big, is used. Therefore an efficient doorbell and notification mechanism for in-system use is desirable.

The present invention addresses this need. Generally, this is done by enabling cache-line based in-system notifications.

An embodiment of the invention includes the injection of a notification or work request into the cache of a server processing unit. A mechanism that enables directed injection of cache-lines is, for example, described in the above-identified European Patent Application No. 08105023.9, for "Method And Arrangement For Directing Cache Injection." While injecting the cache-line, the line is marked as having notification data using a mechanism as, or similar to, described in European Patent Application No. 07122112.1 "Memory Device."

Figure 2:
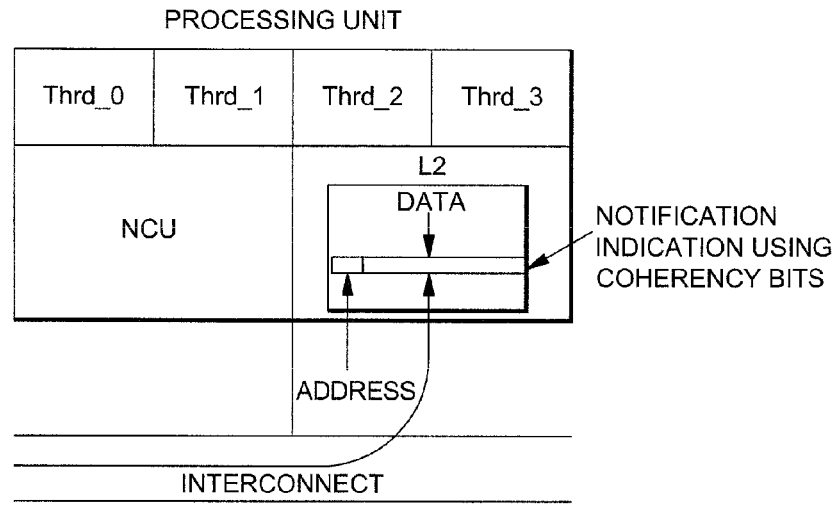
FIG. 2 illustrates a cache line injection.

An embodiment of the invention relies on the availability of two methods for operation of the processor inter connect and processor cache respectively. The first method is used for directed injection of cache-lines. This step is comprised of two main parts, first the determination of the destination processing unit which can be dynamically adaptable (see European Patent Application No. 08105023.9) or fixed. As represented in FIG. 2, the second main part is the transfer of the cache-line over the processor interconnect into the cache of the destination processing unit. In the destination processing unit, the injected cache-line is specially marked as described in European Patent Application No. 07122112.1 with an attribute injected as well as a special further attribute indicating that the CL has notification data.

Further information for the cache line can include its thread-affiliation if it is determinable—for example during the destination processing unit exploration phase. On completion of the injection process, the threads of the processing unit are notified. If a special destination could be detected during the injection process, only the destination thread is notified, otherwise all threads configured to accept notifications are notified of a new injected cache-line. The notification can include waking-up of sleeping threads or just notification-presentation as described below.

The second method of this embodiment is the presentation of the notification to the destination thread or threads. Two possible presentation modes are possible, depending on the mode of operation of the different threads. If a thread is running in user-mode—that is it uses virtual addressing—the first part of the cache-line (for example 8 bytes) is presented to the thread in a read-only register. If a thread is running in real-mode—that is it uses real addresses—it is also possible to present the real address of the cache-line containing the notification information to the thread.

Figure 3:
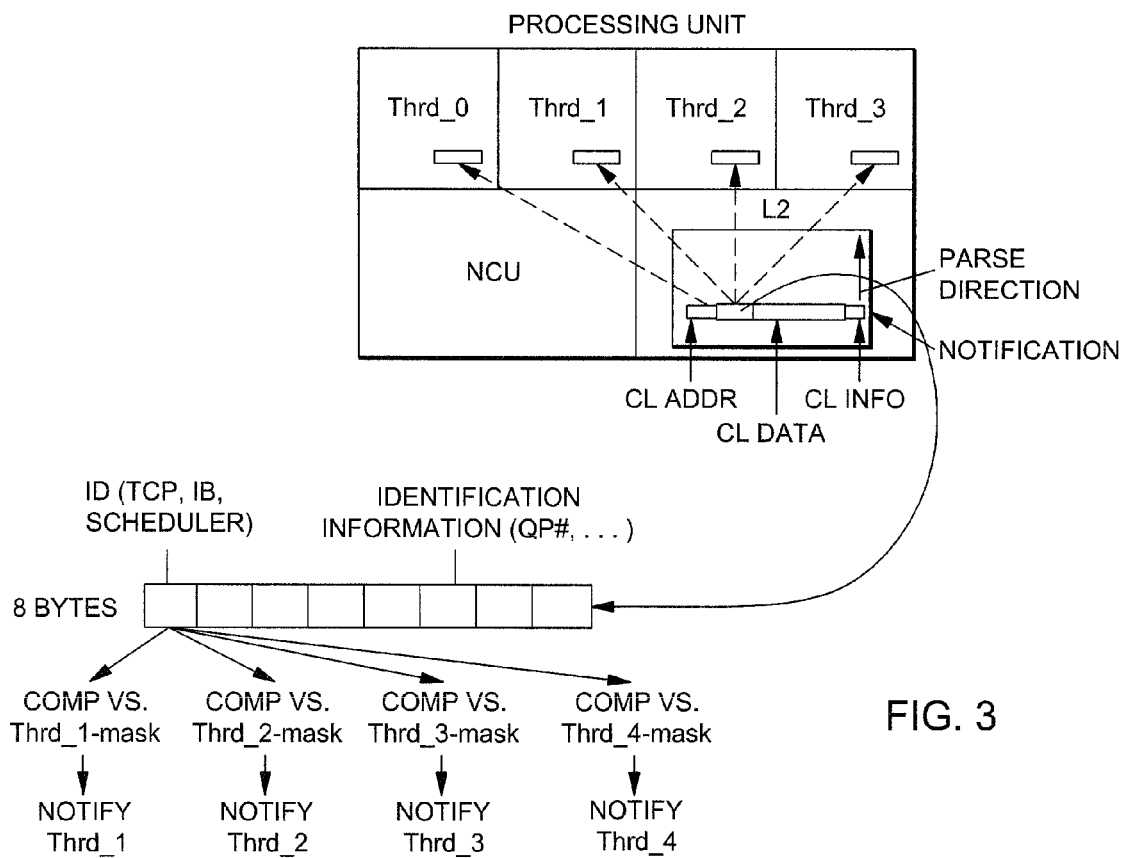
FIG. 3 shows the presentation of notification data.

With reference to FIG. 3, in order to reduce the number of threads that the injected data is presented to, a pre-selection mechanism can be used which uses for example some of the bits of the presented information in order to differentiate between different notification types. Possible notifications are then encoded by software and could for example include notifications for TCP/IP, InfiniBand or the OS-scheduler. Using different masks for the different threads which represent what type of application is currently running on a thread, the presentation of the notification data can thus be limited to threads which are possible destinations for the notification.

The presented notification data should allow the thread to clearly determine the destination of the notification. For example, in InfiniBand and using this mechanism as a doorbell mechanism, the presented part of the notification may include the QP-number which the notification is destined for—this complies with the format of the work-requests used in today's InfiniBand implementation. Using the information of the notification, the destination thread can thus access the notification using its virtual address. For threads running in user-mode, this is essential since it is not possible to translate the real address of the notification cache-line back into a virtual address which would be needed by such a destination thread to finally access the notification. For threads running in real-mode however, presentation of the real-address of the injected cache line is an option since the thread can also use this information.

In some cases, however, it might be favorable to present the first part of the notification to the destination thread as well since then the cache-line does not necessarily need to be brought into the level 1 cache of the processing unit at once, but it can be fetched later-on when the rest of the notification data is really needed. A cache-line marked notification is unmarked, either when it is accessed by a thread, as described in European Patent Application No. 07122112.1, or it can be unmarked using a special instruction/a write to the read-only register. Therefore it is not necessary to access the cache-line. In order to facilitate detection and lookup of notification-marked cache-lines, congruence-class (also known as set) directory-entries are marked to indicate that they have notification cache-lines. Therefore, a cache can be parsed efficiently for notification cache-lines. If more than one notification-marked cache-line is present in a cache, parsing for those cache-lines should be in the reverse order of the congruence-classes. Therefore, consecutive notifications of one requestor, which will in the normal case hit consecutive congruence classes, are not served back-to-back, increasing fairness for the serving of requests.

In one mode of operation of the present invention, the serving thread uses the notifications such that the serving thread creates a linked list out of those notifications. This process is quite expensive if implemented in hardware because the "context" of the last request needs to be present in order to link the requests together. This can be implemented in a processing unit much more efficiently by taking advantage of the processing-unit cache. One drawback of the presented notification mechanism is that it does not offer a true FIFO-capability. The method of inverse congruence-class parsing for notifications is aimed at compensating for this shortcoming. However, if there are too many requests arriving at the same time, it will not be possible to guarantee FIFO-order of the requests. Depending on the implementation, the mechanism could become imprecise if injected notification cache-lines would be cast-out of the cache before they were seen by the serving thread. However, processor interconnect mechanisms can be used in order to create back-pressure into the requesting processing unit, which would also occur if an external device were driven into an overload-situation. Furthermore, since the cache is used for accommodating the notification requests, the number of notifications that can be handled without applying back-pressure mechanisms is huge compared to a dedicated hardware-unit.

An example where this method can be used efficiently is on-loading of TCP/IP packet processing. In this example, there is a typical N-to-1 communication scenario, which means there is one serving process which is used by many consumers. The serving process is the TCP/IP-stack and the consumers are processes which want to send or receive data. Investigations into this topic have shown that an at least two-threaded processing unit is most efficient for on-loading the TCP/IP-processing, one thread for receive side processing and one for send-side processing.

Figure 4:
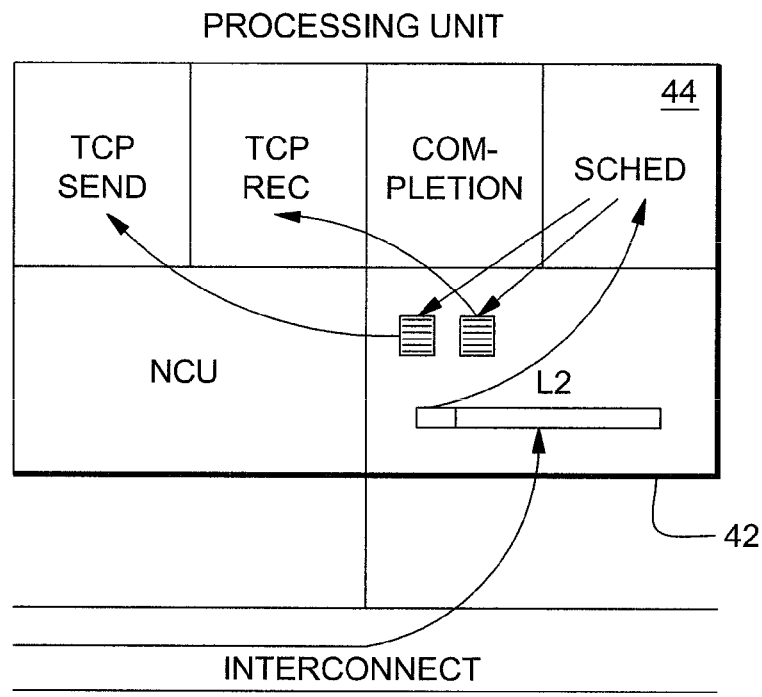
FIG. 4 illustrates an example of the present invention, in which the invention is used for on-loading of TCP/IP packet processing.

With reference to FIG. 4, using the method disclosed herein, the consumers can now inject their cache-line based requests directly into the cache 42 of the processing unit without any operating system interaction. If there is no work to be done, all threads in the processing unit can be sleeping in order to save power. On injection of a notification/request into the cache, the cache-line is marked as described above and presented to the scheduling thread 44. The scheduling thread analyzes the first part of the data of the request that is presented to it, and attaches the request to the correct queue for send- or receive operation. The cache line is then unmarked and, if present, the next request can be handled by the scheduler. The send-process can watch the head of the send-queue (and be woken up by an update of the data) and process the request afterwards. At the same time, there is no cache miss for the request since it usually still resides in the cache. Therefore there is no latency and no further overhead inferred on the bus.

Figure 5:
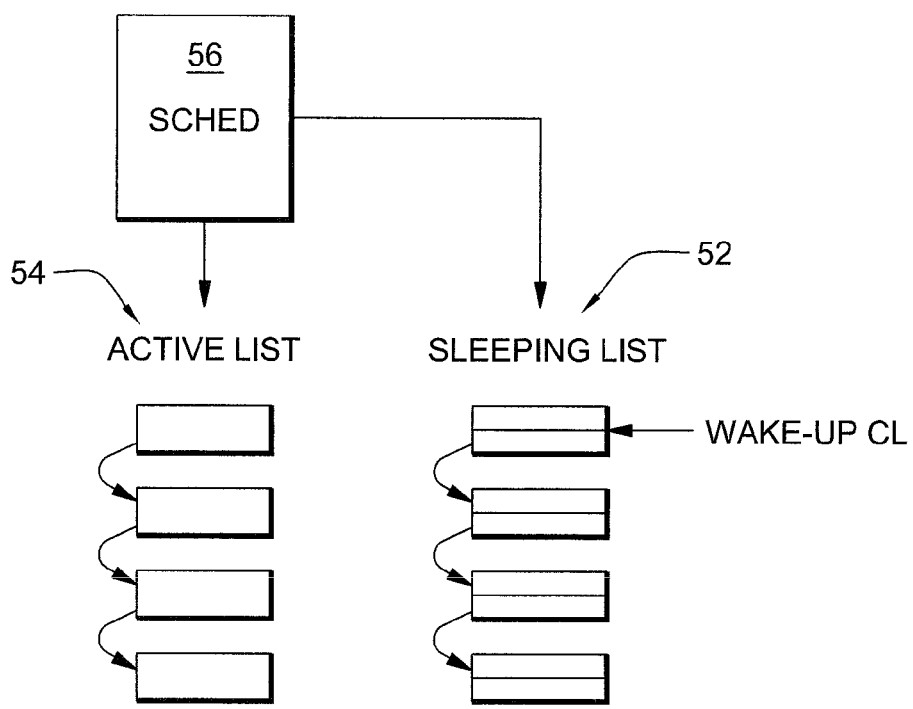
FIG. 5 shows another example of this invention, in which the present invention is used for IO-unit scheduler interaction.

As a second example, an embodiment of the invention can be used for IO device-scheduler interaction. With reference to FIG. 5, in many network-processing applications, a process is sent sleeping and woken up afterwards when a packet has arrived. Therefore, using an embodiment of the invention, a cache-line can be defined which will be written by the IO device if data was received for the process and it has to be woken up. The IO device injects this notification using an embodiment of the invention, with an indication that the notification is addressed to the scheduler 56. The scheduler maintains two lists of processes, one for active ones 54 which can be scheduled, and one for sleeping processes 52 that are waiting for an event. Every time the scheduler is called, it checks if there is a notification for the scheduler outstanding by checking if there is any data presented in the notification register. If there was a wake-up notification, the process can be woken up and considered for scheduling, otherwise scheduling is continued as normal. The advantage of this mechanism is that there is no necessity for an interrupt and therefore no interrupt-overhead and no OS-interaction for waking up a sleeping thread, while any process that is woken up by an event can be automatically considered for scheduling during the next scheduling cycle.

Important advantages of embodiments of the invention include the possibility to avoid system-calls for notifications in asynchronous communication models for in-system requests. System-calls are one of the main latencies in TCP/IP processing. Therefore, there is great interest at the moment in reducing the need for those calls. Embodiments of the invention described herein can furthermore achieve fast notification by avoiding cache-misses for requests or notifications since those are, at the same time, used as doorbells. An important advantage of embodiments of the invention over today's methods however, is the possibility to monitor an unlimited number of notifications while the number of simultaneous notifications is only limited by the cache size and architecture (set-associativity). Therefore an advantage of an embodiment of the invention is that it is very scalable, since it can use the whole cache-space for notification, and moreover, it can be deployed efficiently in multi-threaded processing units. Furthermore embodiments of the invention provide any processing unit in the system with the possibility to act efficiently as an N-to-1 server, rendering the need of a specialized unit unnecessary.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of cache-line based thread notification in a processing unit including a cache, and wherein a plurality of threads are operating on the processing unit, the method comprising:
   injecting into the cache of the processing unit a cache-line including notification and thread identification information for identifying each of one or more of the threads operating on the processing unit as a destination thread for the cache-line;
   marking the cache-line as having the notification information;
   using the thread identification information in the cache-line to identify each of one or more of the threads operating in the processing unit as a destination thread for the cache-line, including each of the plurality of threads using the thread identification information in the cache-line to determine whether said each thread is a destination thread for the cache line; and
   notifying each of said one or more of the threads identified as a destination thread of the presence of the marked cache-line in the cache.

2. The method according to claim 1, wherein the cache-line identifies a thread affiliation.

3. The method according to claim 2, wherein a multitude of threads operate on the processing unit, the thread affiliation identifies only one of said threads, and the notifying includes notifying only said one of the threads of the presence of the cache-line in the cache.

4. The method according to claim 1, wherein a multitude of threads operate in the processing unit, and the notifying includes notifying a plurality of said multitude of threads of the presence of the cache-line in the cache.

5. The method according to claim 1, wherein said marking is done while injecting the cache-line into the cache.

6. The method according to claim 5, wherein said marking is done when the cache-line is in the processing unit.

7. The method according to claim 1, further comprising after notifying the processing thread of the marked cache line, unmarking said cache-line.

8. The method according to claim 1, wherein the injecting includes:
   determining the processing unit for which the cache-line is destined; and
   transferring the cache line to the cache of said processing unit.

9. The method according to claim 1, wherein:
   each of the plurality of threads is associated with a mask: and
   the using the thread identification information in the cache-line to identify the one or more of the threads as the one or more destination threads includes
   comparing the mask associated with each of the threads operating on the processing unit with the thread identification information in the cache-line to determine if said each of the threads is one of the one or more of the destination threads for the cache-line.

10. The method according to claim 1, wherein the using the thread identification information in the cache-line to identify each of one or more of the threads operating in the processing unit as a destination thread for the cache-line includes:
    each thread of a defined group of the threads using the thread identification information to determine whether said each thread is a destination thread for the cache line.

11. A method of cache-line based notification, comprising:
    injecting a cache-line including notification information into a cache of a processing unit;
    marking the cache-line as having the notification information; and
    notifying a processing thread operating on the process unit of the presence of the marked cache-line in the cache; and
    wherein the cache includes a plurality of cache-lines, each of said cache-lines includes a notification, and
    the method further comprising said processing unit thread using the notifications to form a linked list of at least some of the cache-lines in the cache.

12. A cache-line based thread notification system, comprising:
    one or more processing units configured for:
    operating a plurality of threads;
    injecting into a cache of one of the processing units a cache-line including notification and thread identification information for identifying
    each of one or more of the threads operating on the processing unit is as a destination thread for the cache-line;
    marking the cache-line as having the notification information;
    using the thread identification information in the cache-line to identify each of one or more of the threads operating in the processing unit as a destination thread for the cache-line, including each of the plurality of threads using the thread identification information in the cache-line to determine whether said each thread is a destination thread for the cache-line; and
    notifying each of said one or more of the threads identified as a destination thread of the presence of the marked cache-line in the cache.

13. The cache-line based notification system according to claim 12, wherein the cache-line identifies a thread affiliation.

14. The cache-line based notification system according to claim 13, wherein a multitude of threads operate in the processing unit, and the notifying includes: notifying a plurality of said multitude of threads of the presence of the cache-line in the cache; and analyzing the cache-line to identify said plurality of threads.

15. The cache-line based notification system according to claim 12, wherein said marking is done while injecting the cache-line into the cache.

16. The cache-line based notification system according to claim 12, wherein the cache includes a plurality of cache-lines, each of said cache-lines includes a notification, and said processing unit thread uses the notifications to form a linked list of at least some of the cache-lines in the cache.

17. An article of manufacture comprising:
    at least one computer usable device having computer readable program code logic tangibly embodied therein to execute a machine instruction in a processing unit for implementing cache-line based thread notification, in a specified processing unit, wherein said specified processing unit is configured for operating a plurality of processing threads said computer readable program code logic, when executing, performing the following:
    injecting into a cache of a the specified processing unit a cache-line including notification and thread identification information for identifying each of one or more of the threads operating on the specified processing unit is as a destination thread for the cache-line;

marking the cache-line as having the notification information;

using the thread identification information in the cache-line to identify each of one or more of the threads operating in the specified processing unit as a destination thread for the cache-line including each of the plurality of threads using the thread identification information in the cache-line to determine whether said each thread is a destination thread for the cache line; and notifying each of said one or more of the threads identified as a destination thread of the presence of the marked cache-line in the cache.

18. The article of manufacture according to claim 17, wherein the cache-line identifies a thread affiliation.

19. The article of manufacture according to claim 18, wherein a multitude of threads operate in the processing unit, and the notifying includes: notifying a plurality of said multitude of threads of the presence of the cache-line in the cache; and analyzing the cache-line to identify said plurality of threads.

20. The article of manufacture according to claim 17, wherein the cache includes a plurality of cache-lines, each of said cache-lines includes a notification, and said processing unit thread uses the notifications to form a linked list of at least some of the cache-lines in the cache.

* * * * *